No. 689,624. Patented Dec. 24, 1901.
G. F. RYAN.
PIPE JOINT.
(Application filed Feb. 6, 1901.)
(No Model.) 2 Sheets—Sheet 1.
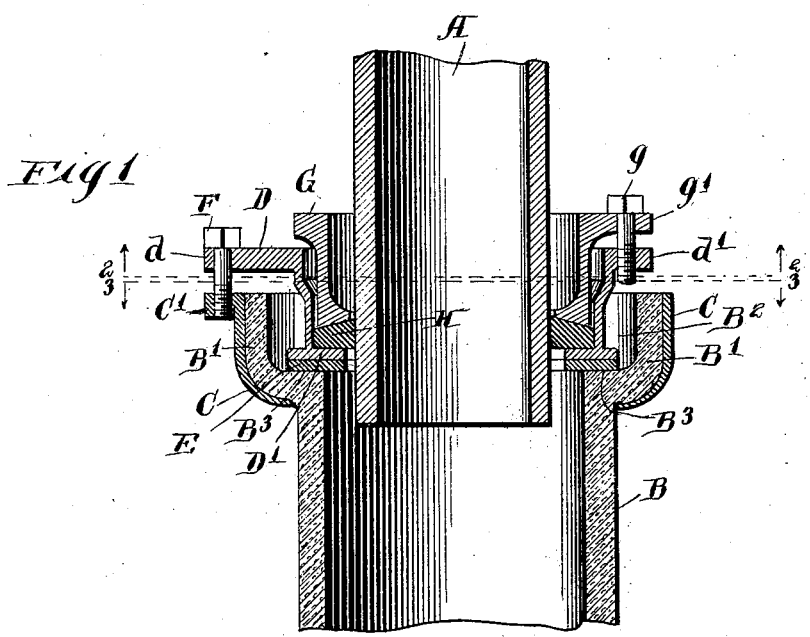
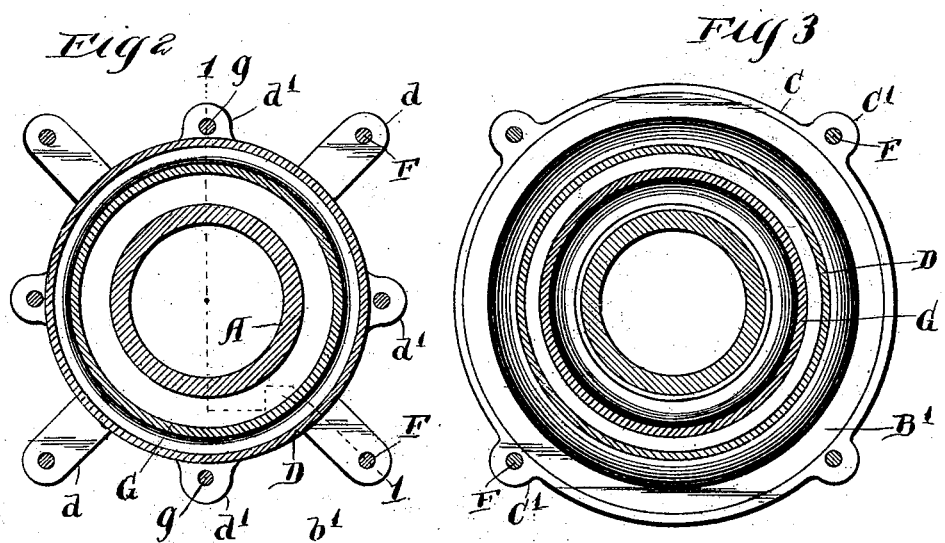
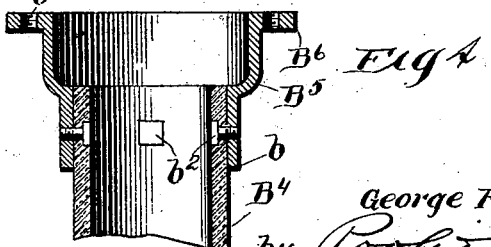
Witnesses:
Carl M. Crawford
W. L. Hall
Inventor:
George Francis Ryan
by Poole & Brown
his Attorneys No. 689,624. Patented Dec. 24, 1901.
G. F. RYAN.
PIPE JOINT.
(Application filed Feb. 6, 1901.)
(No Model.) 2 Sheets—Sheet 2.
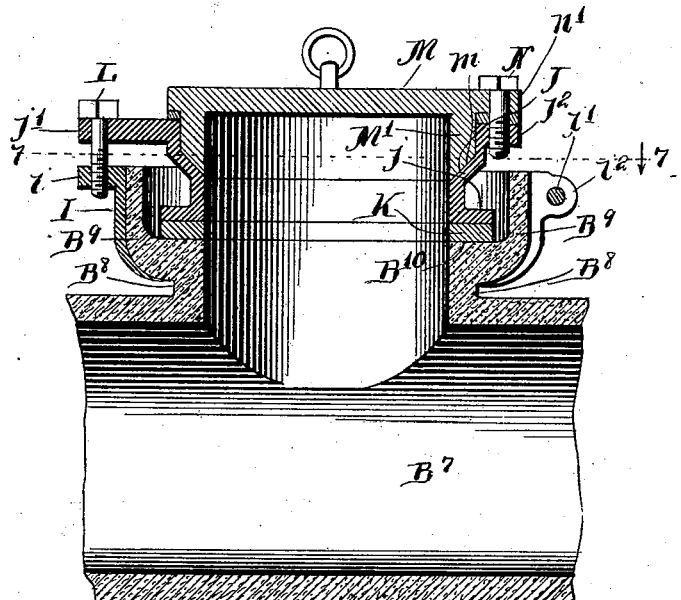
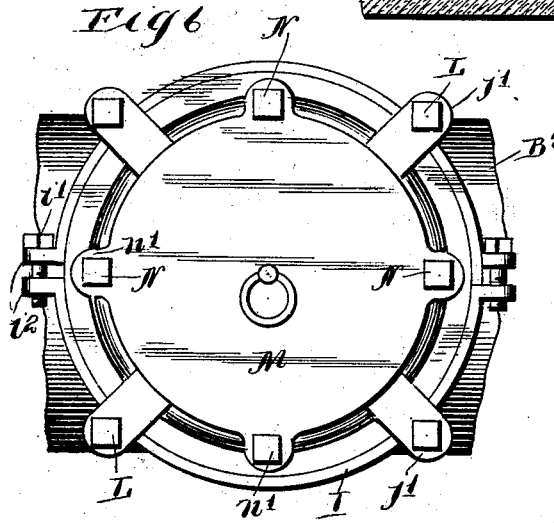
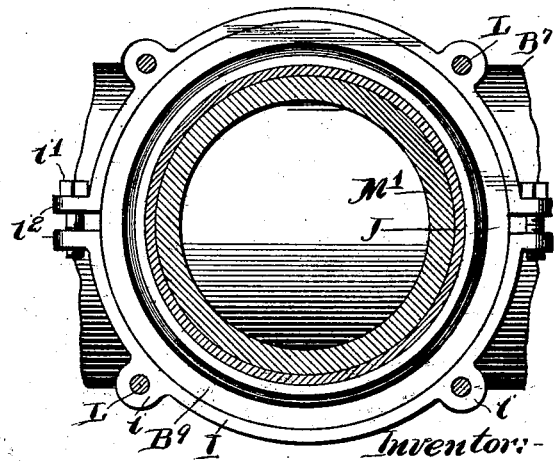
Witnesses:
Carl H. Crawford
W. L. Hall
Inventor:
George Francis Ryan
by Poole & Brown
his Attorneys

UNITED STATES PATENT OFFICE.

GEORGE F. RYAN, OF CHICAGO, ILLINOIS, ASSIGNOR OF ONE-THIRD TO ELLA M. COZENS, OF CHICAGO, ILLINOIS.

PIPE-JOINT.

SPECIFICATION forming part of Letters Patent No. 689,624, dated December 24, 1901.

Application filed February 6, 1901. Serial No. 46,176. (No model.)

*To all whom it may concern:*

Be it known that I, GEORGE F. RYAN, of Chicago, in the county of Cook and State of Illinois, have invented certain new and useful Improvements in Pipe-Joints; and I do hereby declare that the following is a full, clear, and exact description thereof, reference being had to the accompanying drawings, and to the letters of reference marked thereon, which form a part of this specification.

This invention relates to a novel pipe-joint which is primarily intended for connecting a non-metallic pipe, such as an earthenware pipe, with a metallic pipe or like annular part, said joint being constructed to prevent leakage of fluid between the connected parts. A joint made in accordance with my invention may be employed wherever it is desirable to connect a metallic pipe or like annular part with a non-metallic pipe—such, for instance, as the connection of a metallic soil-pipe with an earthware sewer-pipe. Certain of the features of the invention may, however, be employed to connect two metallic pipes, as will hereinafter more fully appear.

In the drawings, Figure 1 is a longitudinal section of the adjacent ends of an earthenware and a metallic pipe, showing my invention applied thereto, such section being taken on line 1 1 of Fig. 2. Fig. 2 is a transverse section on line 2 2 of Fig. 1 looking in the direction indicated by the arrow. Fig. 3 is a similar section looking in the opposite direction. Fig. 4 is a modification of that part of the joint associated with the earthenware pipe. Fig. 5 is a plan sectional view of my improvement applied to a cleaning-out connection of a sewer-pipe or for analogous use. Fig. 6 is a side elevation thereof. Fig. 7 is a transverse section on the line 7 7 of Fig. 5.

As shown in said drawings, A and B indicate, respectively, the adjacent ends of a metallic soil-pipe and an earthenware sewer-pipe, the pipe A being made of less diameter than the pipe B and extending thereinto. The pipe B is provided at its end with an outwardly-curved flange B', larger in diameter than the pipe itself and which forms at said end of the pipe an enlarged socket B², constructed to receive a portion of the devices constituting the joint. Embracing said flange B' is a metal collar C, which extends with its margin to the outer margin of the flange B' and is provided with a plurality of radially-extending apertured lugs C'. Said collar may be solid or of open construction, as desired.

D designates a ring which enters at its inner end the socket B² and is adjustably connected with the collar C, which surrounds the soil-pipe A. Said ring is cylindric in its main part and provided on its inner margin with an annular surface facing the end of the body of the pipe B, the same being formed on a flat flange D', disposed perpendicularly to the axes of the pipes A and B and extending radially from both sides of the ring. Located inside of said flat annular flange D' of the ring D and at the bottom of the socket B² is an annular seat or shoulder B³, constituting, in effect, the end of the pipe B. Interposed between said flange D' and the annular seat B³ is an annular gasket E, made of rubber or any suitable yielding material. Such gasket is adapted to be compressed between the flange D' and seat B³ by pressure applied to the ring D, and thereby make a tight joint between said parts. Said ring is connected with the collar C by devices adapted for applying such inward pressure, the ring being provided with outwardly-projecting apertured lugs d, through which pass screw-bolts F, said bolts having screw-threaded engagement with the apertured lugs C' of the collar C.

G designates a second ring surrounding the pipe A and with its inner end located within the cylindric part of the ring D. Between the inner end of said ring G and the radially inner part of the flange D' of the ring D is interposed a yielding gasket H. Said gasket is adapted to be compressed between said parts by pressure applied to the ring G in a manner to force said ring radially inwardly. The pressure is applied to said ring G through the medium of screw-bolts g, which pass through apertured lugs g', extending radially from the ring G, and which bolts engage at their inner ends screw-threaded apertured lugs d', extending radially outwardly from the collar D, said lugs being located intermediate the lugs d thereon. The gasket H is provided with an oblique outer face, as clearly shown in Fig. 1, and the adjacent end of the ring G is correspondingly inclined, the inclination of said parts being such that when inward pressure is applied to said ring by the means described it will act to expand the said gasket H laterally inwardly against the adjacent surface of the pipe, and thereby prevent the escape of fluid between the ring D and said pipe.

In Fig. 4 I have shown a modification of that part of the device associated with the earthenware pipe which is adapted to form part of a connection between a metallic pipe and an unflanged earthenware pipe $B^4$. In this instance the pipe is provided with a metallic collar or tube $B^5$, having a cylindric part $b$, which embraces the plain end of the pipe and which is provided beyond the end of the pipe with a cylindric flange $B^6$, larger in diameter than the collar $B^5$ and forming a socket similar to that formed by the flange $B'$ of the pipe shown in Fig. 1. Said cylindric part of the sleeve or tube is attached to the pipe $B^4$ by means of bolts $b$ passing through the overlapping parts thereof. Water-tight joints will be formed between the bolts and the pipe by cement or the like. Said flange $B^6$ is provided at its margin with a plurality of radially-extending apertured lugs $b'$, which are internally screw-threaded to receive screw-bolts like the bolts F of the construction previously described, it being understood that the parts of the pipe-joint inclosed within said flange $B^6$ are like the similar parts shown in Fig. 1.

In Figs. 5, 6, and 7 I have shown my invention applied to a short lateral branch of a sewer-pipe employed to afford a cleaning-opening in the pipe, the construction being designed to afford a fluid-tight joint between such a branch pipe and a closure therefor. As shown in said figures, $B^7$ designates an earthenware sewer-pipe provided with a branch $B^8$. Said branch $B^8$ is formed at its end to provide an enlarged flange $B^9$, which flange forms a socket at the end of the pipe like the socket $B^2$ of the pipe B. (Shown in Fig. 1.) I designates a collar shaped to embrace said flange and is similar in form and purpose to the collar C of the construction shown in Fig. 1. Said collar I is in this construction made of two parts or segments joined by bolts $i'$, passing through overlapping lugs $i^2$, formed on the ends of said segments. This construction is provided to facilitate the placing of the collar on the pipe. Said collar is provided at its margin with a plurality of radially-directed apertured lugs $i$, located at the outer margin of the flange $B^9$.

J designates a ring which enters at its inner end the socket inclosed by the flange $B^9$, said ring being provided at its inner margin with a radially outwardly directed flange $j$. Between said flange and a seat $B^{10}$, formed at the bottom of said socket and surrounding the opening in said branch pipe, is a gasket K, made of yielding material and which is adapted to be compressed between the flange $j$ and said seat by pressure brought upon the ring. Said pressure is applied to the ring through the medium of screw-bolts L, which pass through apertured lugs $j'$, extending radially outwardly from the ring J, and which bolts have screw-threaded engagement with the apertured lugs $j$ of the collar I. The ring J forms, in effect, an extension of the branch $B^8$, and the outer end of said ring is closed by a cap or closure M, which fits thereover and which is provided with an inwardly-directed flange $M'$, which enters the open end of said ring J. The said flange $M'$ of the closure is provided with a conical or beveled and ground surface $m$ at its inner end, which surface seats against a corresponding beveled seat in the interior of the ring J. The closure is attached to the ring J by means of screw-bolts N, which pass through apertured lugs $n'$ of said lugs and engage corresponding apertured lugs $j^2$ on the ring J. With this construction the beveled margin of the flange $M'$ may be forced tightly against the beveled seat in the ring, so that a fluid-tight joint is provided at this place. In order to further provide against the escape of fluid between the closure and the ring J, said closure is constructed to overlap the outer end of said ring, and interposed between said overlapping parts of the ring and closure is a yielding gasket O, which is compressed between said parts by the action of the screw-bolts N. The same construction shown in Fig. 5 may be used to connect the end of a metallic pipe with an earthenware pipe, it being obvious that the end of such metallic pipe may be fitted to enter the ring J and provided with a beveled end surface fitting on the beveled seat in said ring, the end of the pipe in that case corresponding with the flange $M'$. (Shown in said Fig. 5.) When the construction described is used in connection with a sewer and the sewer is to be inspected, the closure is removed by first removing the bolts N, and when the closure is removed an opening the full size of the sewer-pipe is afforded, through which access may be had to the sewer. It will be observed that the ring J constitutes, in effect, an extension of the branch pipe and remains immovable in the pipe after being once adjusted therein. The construction shown in Figs. 5, 6, and 7 may be used for cellar and area drains or for vent connections, fresh-air inlets, and the like.

By the constructions described I am enabled to connect a metallic to a non-metallic pipe and at the same time to provide between said pipes a joint which is fluid-tight even when said pipes contain fluid under considerable pressure. A practical difficulty attending the joining of metallic and non-metallic pipes to provide a fluid-tight joint is, first, that interfitting connections cannot be formed on the non-metallic pipe—such, for instance, as screw-threads—by which the same may be clamped upon another pipe, and, secondly, that such material cannot be finished so accurately as metal to provide smooth contact-surfaces between the parts such as will prevent escape of fluid past the same. With my invention, on the other hand, it is possible to provide between a metallic and non-metallic pipe or like annular part as tight a joint as can be formed between two metallic pipes, so that it is possible to join a metallic and non-metallic pipe and use the same for carrying fluids under considerable pressure and which will at all times assure against the escape of gas at such joints.

The devices hereinbefore described are of special value for plumbers' use in making water and gas tight joints between earthenware sewer-pipes and metallic soil-pipes to take the place of the cement joints heretofore commonly used between such pipes, it being obvious that the construction described affords a joint between such earthenware and metallic pipes as will prevent water or sewer-gas from passing through such joint even when the joint is subjected to considerable pressure. Obviously the joint made as described, and shown in Fig. 1, can be used as an expansion-joint between floors, in connection with metal soil-pipes or the like, or in any other place or position wherein gas and water tight and at the same time a movable or sliding joint is required.

The collar C (shown in Fig. 1) may be made in two parts, like the collar $c^2$, (shown in Fig. 5,) so that the collar when made in two pieces, as described, enables the coupling to be used in cases where it is impossible to take out a length of pipe, as where making connection with a pipe of an old sewer already in place, the construction of said collar in sections obviously making unnecessary the disturbing of the old sewer connections.

A clean-out opening or connection made in the manner described has similar advantages—that is to say, the cover of said clean-out opening can be removed and replaced without disturbing the sewer-pipes or the collar which is attached thereto. Moreover, in the construction described the removal of the cover affords an opening the full size of the sewer-pipe and not only gives the workmen ample room to work and a larger opening than is provided by breaking a hole through the sewer-pipe, as has heretofore commonly been done for cleaning sewers when stopped up, but prevents permanent injury to a pipe occasioned by breaking such holes. It is well known that after a workman has broken holes in a sewer-pipe the sewer is practically ruined, for the reason that the backwater-pressure is liable to force off the patches put over the holes necessarily made by the workmen, allowing sewer-gas to escape and sewage to saturate the ground. The clean-out connection described prevents all such trouble, because when the sewer is once properly laid and a clean-out connection put in at every twenty feet or less the sewer may be cleaned out at any time and will be in the same condition after years of service as when first placed in position. A workman cleaning a sewer thus constructed has no reason for destroying or injuring the sewer at all, for all he needs to do in case of a stoppage is to take off the iron cover of the clean-out opening, do the required work, and then replace the cover. The joint described for the clean-out connection can also be used for area or cellar drains, and in such cases the cover may be used to close the sewer-inlet in the case of a backwater or flood. The pipe connection described can also be used on down-spouts for vent connections and in fresh-air inlets for sewers. The form of construction shown in Fig. 4 is more especially designed for use in connection with sewer-pipes without hubs, or what is known as a "ring-pipe," it being obvious that the collar illustrated in said Fig. 4 may be placed over the end of a ring sewer-pipe which has already been laid and connect the same by bolts, as shown, the bolts being inserted through bolt-holes drilled in both the iron sleeve and the sewer-pipe to accommodate said bolts.

The bolts used for securing together the several parts of the connecting device described will preferably be made of copper or brass, the use of such bolts in connection with iron parts or castings preventing the bolts and iron parts from adhering together by rust, so that the bolts may be taken out at any time without destroying or injuring the bolts or iron parts. Brass or copper bolts are also preferably used for connecting the collar shown in Fig. 4 with the sewer-pipe in order to give greater durability to said bolts.

As before stated, some of the features herein disclosed may be employed for connecting metal pipes. It will be further obvious that many changes may be made in the details of construction without departing from the spirit of the invention, and I do not wish to be limited to such details, except as hereinafter made the subject of specific claims.

I claim as my invention—

1. The combination with a non-metallic pipe and a metallic pipe which enters the end of the non-metallic pipe, said non-metallic pipe being flanged at its end which receives the metallic pipe to form a hub, of a metal cup-shaped ring embracing said hub and a packing connected with said ring and located in said hub for forming a fluid-tight joint between said pipes.

2. The combination with a metallic and a non-metallic pipe, the latter being provided at its end with a flange forming a hub, and the metallic pipe entering the non-metallic pipe through and beyond said hub, of a metal cup-shaped ring which embraces said hub, and a packing connected with said ring for forming a fluid-tight joint between said pipes.

3. The combination with a metallic and a non-metallic pipe, the latter being provided at its end with a flange forming a hub, and the metallic pipe entering the non-metallic pipe through and beyond said hub, of a metallic cup-shaped ring which embraces said hub and a packing-ring located inside of said hub and with which the outer margin of the cup-shaped ring is connected.

4. The combination with a metallic pipe and a non-metallic pipe, the latter being provided at its end with a flange forming a hub, and the non-metallic pipe entering said hub, of a cup-shaped ring embracing said hub and provided at its outer margin with apertured lugs, and a packing-ring in said hub embracing the metal pipe and connected with said apertured lugs.

5. The combination with a non-metallic pipe provided at its end with a flange forming a hub, of a metal ring embracing said hub with its outer margin substantially flush with the margin of the hub and provided at said outer margin with apertured lugs.

6. The combination with a non-metallic pipe provided at its end with a flange forming a hub, of a metal ring embracing said hub with its outer margin substantially flush with the margin of the hub and provided at said outer margin with apertured lugs, said ring being made of two similar parts and said parts being provided at their adjacent ends with overlapping lugs by which said parts are fastened together.

7. A pipe-joint comprising a part which has interfitting attachment with one of the pipes, a ring surrounding the other pipe and adjustably connected with said interfitting part so as to move toward and away from the first-mentioned pipe, a packing interposed between said ring and an annular seat surrounding the bore of said first-mentioned pipe, a second ring surrounding said pipe and entering the outer end of said first ring and adjustably connected therewith, and a second gasket interposed between said first and second rings and constructed, when pressure is applied thereto, to be expanded inwardly against the surface of the pipe within it.

8. A pipe-joint for connecting two pipes, one of which is provided with an enlarged or flanged end forming a socket at the end of the pipe, comprising a collar embracing said flange, a ring surrounding one of the pipes and entering said socket and provided at its inner end with a flat flange disposed perpendicularly to the axes of the pipes, a gasket interposed between said flat flange and an annular seat at the bottom of said socket, a second ring entering the first ring and adjustably connected therewith, and a gasket interposed between said second ring and the flange on the first ring, said parts being constructed to expand said second gasket inwardly against the surface of the pipe, within it.

9. The conbination with a pipe provided at its end with an enlarged flange inclosing a socket at the end of the pipe, a collar embracing said flange, a ring entering said socket and adjustably connected with said collar, a gasket interposed between the inner end of said ring and a seat at the bottom of said socket, a second ring or annular part entering the outer end of the first ring and adjustably connected with the first ring, and means affording a fluid-tight joint between said rings.

In testimony that I claim the foregoing as my invention I affix my signature, in presence of two witnesses, this 2d day of February, A. D. 1901.

GEORGE F. RYAN.

Witnesses:
WILLIAM L. HALL,
GERTRUDE BRYCE.